(12) United States Patent
Yu et al.

(10) Patent No.: US 9,980,216 B2
(45) Date of Patent: May 22, 2018

(54) TERMINAL DEVICE AND OPERATING METHOD OF TERMINAL DEVICE

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Tak Ki Yu, Yongin-si (KR); Sung Ho Moon, Anyang-si (KR); Young Lak Kim, Yongin-si (KR); Tae Guen Kim, Seongnam-si (KR); Min Soo Na, Seongnam-si (KR); Soo Yong Choi, Seoul (KR); Tae Hyung Kim, Incheon (KR); Kyung Sik Min, Seoul (KR); Han Ho Wang, Seongnam-si (KR)

(73) Assignees: SK TELECOM CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days. days.

(21) Appl. No.: 15/500,801

(22) PCT Filed: Jun. 22, 2015

(86) PCT No.: PCT/KR2015/006301
§ 371 (c)(1),
(2) Date: Jan. 31, 2017

(87) PCT Pub. No.: WO2016/017926
PCT Pub. Date: Feb. 4, 2016

(65) Prior Publication Data
US 2017/0223627 A1 Aug. 3, 2017

(30) Foreign Application Priority Data
Jul. 31, 2014 (KR) .................. 10-2014-0098196

(51) Int. Cl.
*H04W 48/02* (2009.01)
*H04W 48/20* (2009.01)
(Continued)

(52) U.S. Cl.
CPC .......... *H04W 48/20* (2013.01); *H04W 16/32* (2013.01); *H04W 24/02* (2013.01);
(Continued)

(58) Field of Classification Search
CPC ..... H04W 48/20; H04W 36/30; H04W 16/32; H04W 24/02; H04W 48/16; H04W 88/06; H04W 48/06; H04W 36/04; H04W 84/045
(Continued)

(56) References Cited

U.S. PATENT DOCUMENTS 8,842,634 B2 * 9/2014 Gomes .............. H04W 36/0088
370/328
8,880,076 B2 * 11/2014 Toda .................... H04W 28/24
370/252
(Continued)

FOREIGN PATENT DOCUMENTS

KR 10-2009-0008398 A 1/2009
KR 10-2009-0034261 A 4/2009
(Continued)

OTHER PUBLICATIONS

International Search Report dated Sep. 22, 2015 corresponding to International Application No. PCT/KR2015/006301.

*Primary Examiner* — Hai V Nguyen
(74) *Attorney, Agent, or Firm* — Hauptman Ham, LLP (57) ABSTRACT

The present disclosure relates a terminal device capable of enhancing cell throughput in consideration of an interference environment created in a heterogeneous network environment where cells of different sizes which use different (Continued)

frequency bands coexist, and a method of operating the same.

15 Claims, 4 Drawing Sheets

(51) Int. Cl.
| | |
|---|---|
| H04W 16/32 | (2009.01) |
| H04W 24/02 | (2009.01) |
| H04W 36/04 | (2009.01) |
| H04W 36/30 | (2009.01) |
| H04W 48/06 | (2009.01) |
| H04W 48/16 | (2009.01) |
| H04W 84/04 | (2009.01) |
| H04W 88/06 | (2009.01) |
| H04W 36/00 | (2009.01) |
| H04W 48/12 | (2009.01) |

(52) U.S. Cl.
CPC ....... *H04W 36/0083* (2013.01); *H04W 36/04* (2013.01); *H04W 36/30* (2013.01); *H04W 48/06* (2013.01); *H04W 48/16* (2013.01); *H04W 84/045* (2013.01); *H04W 88/06* (2013.01); *H04W 48/12* (2013.01)

(58) Field of Classification Search
USPC ......................................................... 455/525
See application file for complete search history.

(56) References Cited

U.S. PATENT DOCUMENTS

| | | | | |
|---|---|---|---|---|
| 9,130,688 | B2* | 9/2015 | Yiu | H04W 76/048 |
| 9,392,542 | B2* | 7/2016 | Ingale | H04W 48/16 |
| 9,398,480 | B2* | 7/2016 | Siomina | H04W 24/10 |
| 9,408,121 | B2* | 8/2016 | Xiao | H04W 36/0088 |
| 9,456,415 | B2* | 9/2016 | Peng | H04W 52/04 |
| 9,538,406 | B2* | 1/2017 | Yang | H04W 48/16 |
| 9,560,560 | B2* | 1/2017 | Yiu | H04W 36/0094 |
| 9,648,527 | B2* | 5/2017 | Maguire | H04W 48/20 |
| 9,674,369 | B2* | 6/2017 | Uchiyama | H04M 11/00 |
| 9,674,725 | B2* | 6/2017 | Yang | H04W 16/32 |
| 9,872,220 | B2* | 1/2018 | Jang | H04W 48/20 |
| 2013/0021929 | A1* | 1/2013 | Kim | H04B 7/024 370/252 |
| 2013/0083744 | A1* | 4/2013 | Peng | H04W 52/04 370/329 |
| 2013/0157665 | A1* | 6/2013 | Toda | H04W 36/30 455/436 |
| 2013/0303231 | A1* | 11/2013 | Yiu | H04W 76/048 455/525 |
| 2014/0126403 | A1* | 5/2014 | Siomina | H04W 24/10 370/252 |
| 2014/0179320 | A1* | 6/2014 | Jang | H04W 48/20 455/436 |
| 2014/0295849 | A1* | 10/2014 | Sirotkin | H04L 5/0085 455/437 |
| 2014/0328327 | A1* | 11/2014 | Xiao | H04W 36/0088 370/332 |
| 2014/0349651 | A1* | 11/2014 | Gomes | H04W 36/0088 455/436 |
| 2015/0016330 | A1* | 1/2015 | Schwartz | H04W 4/22 370/312 |
| 2015/0079988 | A1* | 3/2015 | Su | H04W 36/30 455/436 |
| 2015/0119046 | A1* | 4/2015 | Radulescu | H04L 43/10 455/438 |
| 2015/0215833 | A1* | 7/2015 | Siomina | H04W 36/08 455/436 |
| 2015/0263836 | A1* | 9/2015 | Kim | H04B 7/024 370/329 |
| 2015/0296400 | A1* | 10/2015 | Yang | H04W 16/32 370/252 |
| 2015/0312818 | A1* | 10/2015 | Yiu | H04W 36/0094 455/436 |
| 2015/0327093 | A1* | 11/2015 | Yang | H04W 48/16 370/252 |
| 2015/0350926 | A1* | 12/2015 | Uchiyama | H04M 11/00 455/418 |
| 2015/0373601 | A1* | 12/2015 | Benjebbour | H04W 72/082 370/252 |
| 2016/0119816 | A1* | 4/2016 | Yasukawa | H04W 48/20 455/453 |
| 2016/0192334 | A1* | 6/2016 | Takeda | H04W 48/16 370/329 |
| 2017/0019802 | A1* | 1/2017 | Ode | H04W 48/16 |

FOREIGN PATENT DOCUMENTS

| | | |
|---|---|---|
| KR | 10-2014-0077957 A | 6/2014 |
| KR | 10-2014-0085365 A | 7/2014 |

* cited by examiner

TERMINAL DEVICE AND OPERATING METHOD OF TERMINAL DEVICE

CROSS REFERENCE TO RELATED APPLICATION

This application claims the priority of Korean Patent Application No. 10-2014-0098196, filed on Jul. 31, 2014 in the KIPO (Korean Intellectual Property Office). Further, this application is the National Phase application of International Application No. PCT/KR2015/006301 filed Jun. 22, 2015, which designates the United States and was published in Korean.

TECHNICAL FIELD

The present disclosure relates to a terminal device for realizing a cell selection scheme for improving cell throughput in a heterogeneous network environment where cells that have different sizes and use different frequency bands coexist.

BACKGROUND ART

Recently, a heterogeneous network environment where several base stations forming cells of different sizes coexist in the same area has emerged in the LTE network.

In the heterogeneous network environment, typical macro base stations and various kinds of small base stations having a smaller coverage (cell) coexist. Thereby, various kinds of base stations form macro cells and small cells in an overlapping area and provide wireless communication services for users.

In such heterogeneous network environment, a macro cell and a small cell may use different frequency bands to avoid interference therebetween.

The interference environment created when a macro cell and a small cell use different frequency bands differs from the interference environment created when a macro cell and a small cell use the same frequency band. Accordingly, the effects expected from the heterogeneous network environment, for example, an effect of increasing cell throughput by traffic offloading to the small cells may be lessened.

In view of the above, the exemplary embodiments of the present disclosure propose an approach to appropriately increase cell throughput taking into account the interference environment unique to a heterogeneous network environment where a macro cell and a small cell use different frequency bands.

DISCLOSURE

Technical Problem

An object of the present disclosure is to provide a terminal device capable of enhancing cell throughput in consideration of an interference environment created in a heterogeneous network environment where cells of different sizes which use different frequency bands coexist, and a method for operating the same.

Technical Solution

In accordance with one aspect of the present disclosure, a terminal device includes a measuring unit configured to measure signal received qualities for signals received from a macro cell and small cell; a weight assigning unit configured to assign, to a measured signal received quality value of the small cell, a quality weight determined based on at least one of the measured signal received quality value of the small cell and the number of the small cell; and a cell selector configured to select a cell to access, based on a result of comparison between the measured signal received quality value of the macro cell and a measured signal received quality value of the small cell assigned the quality weight.

The small cells may be included within coverage of the macro cell, and the number of the small cell may be the number of all small cell included within the coverage of the macro cell.

The quality weight may have a value increasing as the measured signal received quality value of the small cell increases and the number of small cell increases.

The weight assigning unit may a weight depending on whether or not the measured signal received quality value of the small cell is greater than or equal to a preset threshold, and determines the quality weight by applying a change value depending on the number of the small cell to the weight.

The weight may include a first weight determined when the measured signal received quality value of the small cell is greater than or equal to the preset threshold; and a second weight determined when the measured signal received quality value of the small cell is less than the preset threshold, the second weight being lower than the first weight, wherein the weight change value may increase as the number of the small cell increases.

The number of the small cells may be recognized through information provided from a base station management system periodically or in response to a request, or recognized from a signal received from at least one of the macro cell and the small cell.

The weight assigning unit may receive the quality weight from at least one of the macro cell and the small cell.

In accordance with another aspect of the present disclosure, a base station includes a weight determining unit configured to determine a quality weight based on at least one of a measured signal received quality value of small cell measured by a terminal and the number of the small cell in relation to the terminal measuring signal received qualities for signals received from a macro cell and the small cell; and a weight providing unit configured to provide the quality weight to the terminal for selecting a cell to access by assigning the quality weight to the measured signal received quality value of the small cell and comparing the measured signal received quality value assigned the quality weight with a measured signal received quality value of the macro cell.

The weight determining unit may determine a weight depending on whether or not the measured signal received quality value of the small cell is greater than or equal to a preset threshold, and determines the quality weight by applying a weight change value depending to the number of the small cell to the weight.

The weight may include a first weight determined when the measured signal received quality value of the small cell is greater than or equal to the preset threshold; and a second weight determined when the measured signal received quality value of the small cell is less than the preset threshold, the second weight being lower than the first weight, wherein the weight change value may increase as the number of the small cell increases.

A cell formed by the base station may be the macro cell or a small cell of the small cells.

In accordance with another aspect of the present disclosure, a method of operating a terminal device includes measuring a signal received qualities for signals received from a macro cell and small cell; assigning, to a measured signal received quality value of the small cell, a quality weight determined based on at least one of the measured signal received quality value of the small cell and the number of the small cell; and selecting a cell to access, based on a result of comparison between the measured signal received quality value of the macro cell and the measured signal received quality value of the small cell assigned the quality weight.

The quality weight may have a value increasing as the measured signal received quality value of the small cell increases and the number of small cell increases.

The weight assignment step may include determining a weight depending on whether or not the measured signal received quality value of the small cell is greater than or equal to a preset threshold; and determining the quality weight by applying a weight change value depending on the number of the small cell to the weight.

The weight may include a first weight determined when the measured signal received quality value of the small cell is greater than or equal to the preset threshold; and a second weight determined when the measured signal received quality value of the small cell is less than the preset threshold, the second weight being lower than the first weight, wherein the weight change value may increase as the number of the small cell increases.

Advantageous Effects

With a terminal device and a method of operating the same according to an embodiment of the present disclosure, cell throughput may be appropriately enhanced in consideration of an interference environment created in the heterogeneous network environment where cells of different sizes which use different frequency bands coexist.

BEST MODE

Reference will now be made in detail to embodiments of the present disclosure, examples of which are illustrated in the accompanying drawings.

Figure 1:
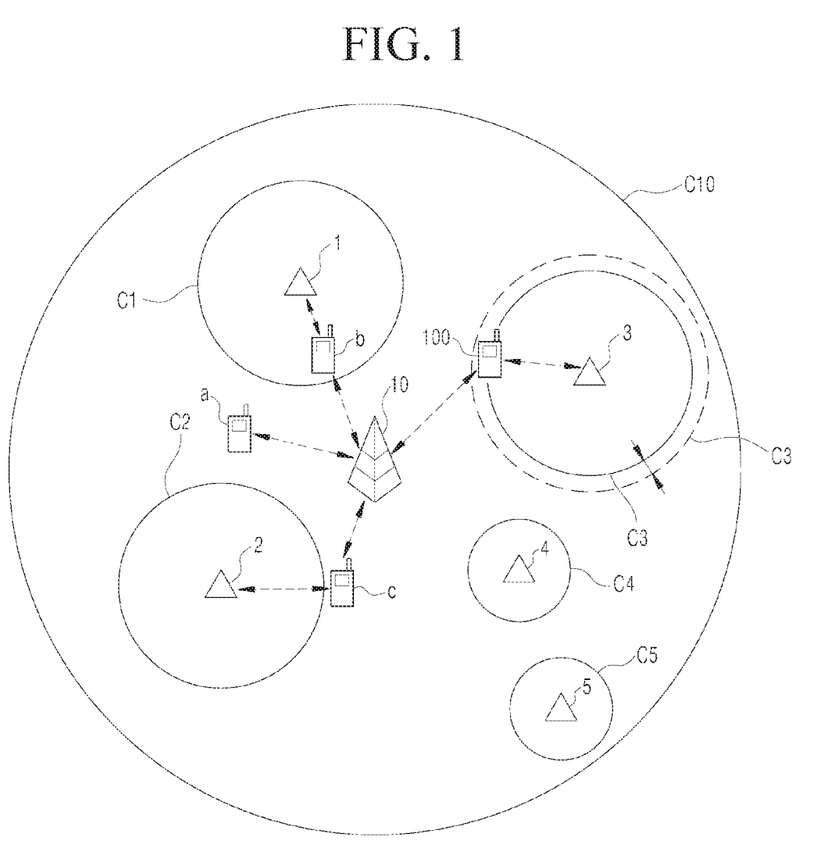
FIG. 1 is a diagram illustrating a communication system including a terminal device according to an embodiment of the present disclosure.

FIG. 1 is a diagram illustrating a communication system including a terminal device according to an embodiment of the present disclosure.

As shown in FIG. 1, a communication system including a terminal device 100 is intended for a heterogeneous network environment where several base stations forming cells of different sizes coexist in the same area.

In other words, as shown in FIG. 1, the present disclosure is applied to a heterogeneous network environment where several base stations forming cells of different sizes, for example, a macro base station 10 forming a macro cell C10 and small base stations 1 to 5 forming small cells C1, C2, . . . , and C5 included within the coverage of the macro cell C10 coexist in the same area.

In such heterogeneous network environment, by installing the small cells C1, C2, . . . , and C5 within the coverage of the macro cell C10, cell throughput may be enhanced through frequency reuse and traffic offloading to the small cells.

In the heterogeneous network environment, the macro cell and the small cells may use different frequency bands. For example, in the heterogeneous network environment, the macro base station 10 may use frequency band f1, and the small base stations 1 to 5 may use frequency band f2.

Hereinafter, for simplicity, it is assumed that the macro base station 10 uses frequency band f1, and the small base stations 1 to 5 use frequency band f2.

The interference environment created when the macro cell C10 and the small cells C1, C2, . . . , and C5 use different frequency bands as described above differs from the interference environment created when the macro cell and the small cells use the same frequency band.

That is, when the macro cell C10 and the small cells C1, C2, . . . , and C5 use different frequency bands, interference does not occur between the macro cell C10 and the small cells C1, C2, . . . , and C5, in contrast with the interference environment created when the macro cell and the small cells use the same frequency band. Of course, in this case, there will be interference between macro cells in the frequency band f1 and interference between small cells in the frequency band f2, as in conventional cases.

When an interference environment different from the conventional interference environment is created in the heterogeneous network environment as the macro cell C10 and the small cells C1, C2, . . . , and C5 use different frequency bands, an effect that is originally intended to be achieved in the heterogeneous network environment, for example, the effect of enhancement of cell throughput through traffic offloading to small cells may be lessened due to the created interference environment.

More specifically, in performing inter-cell handoff, a terminal receives signals from neighboring base stations, measures reference signal received qualities (RSRQ) of the neighboring base stations, and connects to the cell of a neighboring base station having the highest RSRQ.

In the heterogeneous network environment, as the number of small cells installed within the coverage of a macro cell increases, terminals tend to connect to the macro cell without traffic offloading to the small cells, which is called a "macro cell concentration effect".

The macro cell concentration effect occurs because the RSRQ of the macro base station in the frequency band f1 measured by a terminal remains constant regardless of the number of small cells installed within the coverage of the macro cell, while the RSRQ of the small cells in the frequency band f2 gradually decreases due to interference among the small cells as the number of the small cells increases.

Accordingly, as the macro cell C10 and the small cells C1, C2, . . . , and C5 use different frequency bands, the effect of enhancement of cell throughput may be lessened with increase in the number of small cells in the heterogeneous network environment.

To address this issue, the present disclosure proposes a method of appropriately enhancing cell throughput in consideration of interference in the heterogeneous network environment.

Hereinafter, a terminal device for implementing the proposed method of the present disclosure according to an embodiment of the present disclosure will be described with reference to FIG. 2.

Figure 2:
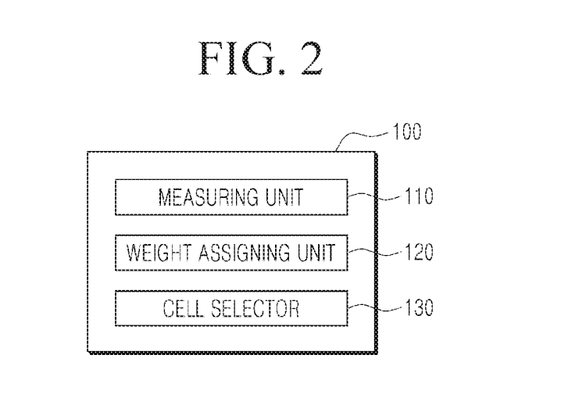
FIG. 2 is a block diagram specifically illustrating a terminal device according to an embodiment of the present disclosure.

As shown in FIG. 2, the terminal device 100 according to an embodiment of the present disclosure includes a measuring unit 110 configured to measure RSRQs signals received from a macro cell and small cells, a weight assigning unit 120 configured to assign, to the measured RSRQ value of the small cells, a quality weight determined based on at least one of the measured RSRQ value of the small cells and the number of small cells, and a cell selector 130 configured to select a cell (hereinafter, "access cell") based on the result of comparison between the measured RSRQ value of the macro cell and the measured RSRQ value of the small cells assigned the quality weight.

Herein, the terminal device 100 is assumed to be positioned at the cell boundary of the small cell C3, as shown in FIG. 1.

The measuring unit 110 measures RSRQs for signals received from the macro cell and the small cells.

That is, the measuring unit 110 receives signals from neighboring base stations and measures RSRQs of the neighboring base stations.

If the terminal device 100 is positioned at the cell boundary of the small cell C3 as shown in FIG. 1, the measuring unit 110 may measure RSRQs for the signals of the macro base station 10 and the small base station 3, namely the signals received from the macro cell C10 and the small cell C3.

Hereinafter, for simplicity, the RSRQ value of the macro cell C10 measured by the measuring unit 110 is referred to as "RSRQm", and the RSRQ value of the small cell C3 measured by the measuring unit 110 is referred to as "RSRQs".

The weight assigning unit 120 assigns, to the measured RSRQ value (i.e., RSRQs) of the small cell C3, a quality weight determined based on at least one of RSRQs and the number of small cells.

Herein, the number of small cells refers to the number of all small cells included within the coverage of the macro cell C10. In the case of FIG. 1, this number is 5, which indicates the small cells 1, 2, 3, 4, and 5.

In addition, as the measured RSRQ value (RSRQs) of the small cell C3 increases, the value of the quality weight assigned to RSRQs increases. In addition, as the number of small cells increases, the quality weight assigned to the RSRQs increases.

According to a first embodiment, the terminal device 100, particularly, the weight assigning unit 120 may directly determine the quality weight. According to a second embodiment, the terminal device 100, particularly, the weight assigning unit 120 may receive the quality weight from at least one of the macro cell C10 and the small cell C3.

Specifically, in the first embodiment, the weight assigning unit 120 may determine a different weight depending on whether or not the measured RSRQ value (RSRQs) of the small cell C3 is greater than or equal to a preset threshold, and determine a quality weight by applying a different weight change value to the weight according to the number of small cells.

First, the weight assigning unit 120 determines whether or not the RSRQ value (RSRQs) of the small cell C3 measured by the measuring unit 110 is greater than or equal to a preset threshold.

If the measured RSRQ value (RSRQs) of the small cell C3 is greater than or equal to the threshold, the weight assigning unit 120 may determine a first weight. If the measured RSRQ value (RSRQs) of the small cell C3 is less than the threshold, the weight assigning unit 120 may determine a second weight, which is lower than the first weight.

In other words, if the measured RSRQ value (RSRQs) of the small cell C3 is greater than or equal to the threshold, the weight assigning unit 120 may determine the first weight, which is the higher weight, such that the coverage of the small cell C3 appears to be sufficiently extended (C3->C3' of FIG. 1) according to the first weight.

If the coverage of the small cell C3 is excessively extended when the measured RSRQ value (RSRQs) of the small cell C3 is less than the threshold, this may rather extend outage.

Accordingly, if the measured RSRQ value (RSRQs) of the small cell C3 is less than the threshold, the weight assigning unit 120 determines the second weight, which is the lower weight, such that the coverage of the small cell C3 appears to be extended slightly so as not to excessively extend the coverage.

Once the weight assigning unit 120 determines the first weight or second weight as described above, the weight assigning unit 120 may apply a different weight change value according to the number of small cells to the first weight or second weight, thereby determining a quality weight.

The terminal device 100 may receive, from a system (e.g., base station management system) which manages multiple macro base stations including the macro base station 10 and/or multiple small base stations including the small base stations 1 to 5, the number of small cells included in the macro cell C10 where the terminal device 100 is positioned periodically or in response to a request, and recognize the same.

Alternatively, the terminal device 100 may recognize, from a signal received from at least one of the macro cell C10 and the small cell C3, the number of small cells included in the macro cell C10 where the terminal device 100 is positioned.

Once the weight assigning unit 120 determines the first weight or second weight as described above, the weight assigning unit 120 applies the different weight change value to the first weight or second weight that is determined according to the number of small cells (e.g., 5) recognized from the base station management system (not shown).

Herein, the weight change value may increase as the number of small cells increases.

For example, taking the number of small cells as a parameter, the weight assigning unit 120 may identify the weight change value using a predesignated calculation algorithm in order to compute a greater weight change value for a greater value of the parameter.

By applying the weight change value which increases with increase in the number of small cells to the predetermined weight (e.g., the first weight or second weight), the weight assigning unit 120 may determine a quality weight as a result.

In other words, by applying a greater weight change value with a greater number of small cells within the coverage of the macro cell C10 to the weight (e.g., the first weight or second weight) appropriately determined according to the measured RSRQ value (RSRQs) of the small cell C3, the weight assigning unit 120 makes the coverage of the small cell C3 appear to further extend (C3->C3' of FIG. 1) as the number of small cells increases.

In a second embodiment, the weight assigning unit 120 receives a quality weight from at least one of the macro cell C10 and the small cell C3.

In other words, the weight assigning unit 120 may receive, from a base station forming the macro cell C10 or the small cell C3, namely the macro base station 10 or the small base station 3, the quality weight determined based on at least one of the measured RSRQ value (RSRQs) of the small cell C3 and the number of the small cells.

Hereinafter, a base station providing a quality weight according to an embodiment of the present disclosure will be described with reference to FIG. 3.

Figure 3:
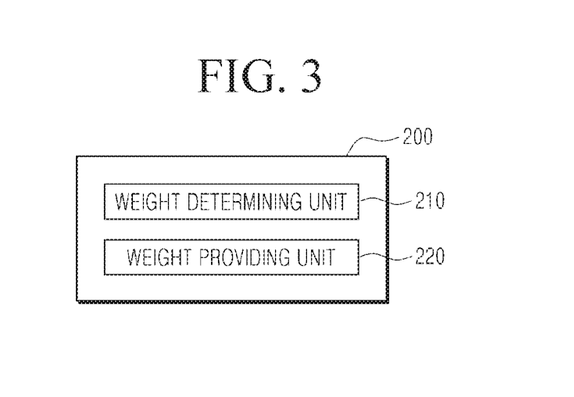
FIG. 3 is a block diagram specifically illustrating configuration of a base station according to an embodiment of the present disclosure.

As shown in FIG. 3, a base station 200 according to an embodiment of the present disclosure includes a weight determining unit 210 configured to determine a quality weight based on at least one of an RSRQ value of small cells measured by a terminal configured to measure RSRQs for signals received from a macro cell and the small cells and the number of the small cells, and a weight providing unit 220 configured to provide the determined quality weight to the terminal such that the terminal can select a cell to access by assigning the quality weight to the measured RSRQ value of the small cells and comparing the measured RSRQ value assigned the quality weight with the measured RSRQ value of the macro cell.

Hereinafter, for simplicity, the terminal is assumed to be the terminal device 100 positioned at the cell boundary of the small cell C3 as shown in FIG. 1.

In this case, the base station 200 according to an embodiment of the present disclosure may be the macro base station 10 or small base station 3 which is capable of providing the quality weight to the terminal device 100.

The weight determining unit 210 determines a quality weight based on at least one of the RSRQ value (RSRQs) of the small cell C3 measured by the terminal 100 configured to measure RSRQs for signals received from a macro cell C10 and small cell C3 and the number of the small cells.

Specifically, the weight determining unit 210 may acquire the RSRQ value (RSRQs) of the small cell C3 measured by the terminal 100 from the terminal device 100 having measured RSRQ for signals received from the macro cell C10 and small cell C3.

Thereby, the weight determining unit 210 determines the quality weight based on at least one of the measured RSRQ value (RSRQs) of the small cell C3 and the number of small cells.

Specifically, the weight determining unit 210 may determine a different weight depending on whether or not the measured RSRQ value (RSRQs) of the small cell C3 is greater than or equal to a preset threshold, and determine the quality weight by applying a different weight change value to the weight according to the number of small cells.

First, the weight determining unit 210 determines whether or not the measured RSRQ value (RSRQs) of the small cell C3 is greater than or equal to a preset threshold.

If the measured RSRQ value (RSRQs) of the small cell C3 is greater than or equal to the threshold, the weight determining unit 210 may determine a first weight. If the measured RSRQ value (RSRQs) of the small cell C3 is less than the threshold, the weight determining unit 210 may determine a second weight which is lower than the first weight.

In other words, if the measured RSRQ value (RSRQs) of the small cell C3 is greater than or equal to the threshold, the weight determining unit 210 may determine the first weight, which is the higher weight, such that the coverage of the small cell C3 appears to be sufficiently extended (C3->C3' of FIG. 1) according to the first weight.

If the coverage of the small cell C3 is excessively extended when the measured RSRQ value (RSRQs) of the small cell C3 is less than the threshold, this may rather extend outage.

Accordingly, if the measured RSRQ value (RSRQs) of the small cell C3 is less than the threshold, the weight determining unit 210 determines the second weight, which is the lower weight, such that the coverage of the small cell C3 appears to be extended slightly so as not to excessively extend the coverage.

Once the weight determining unit 210 determines the first weight or second weight as described above, the weight determining unit 210 may apply a different weight change value to the first weight or second weight according to the number of small cells, thereby determining the quality weight.

The terminal device 100 may receive, from a system (e.g., base station management system) which manages multiple macro base stations including the macro base station 10 and/or multiple small base stations including the small base stations 1 to 5, the number of small cells included in the macro cell C10 where the terminal device 100 is positioned periodically or in response to a request, and recognize the same.

Once the weight determining unit 210 determines the first weight or second weight as described above, the weight determining unit 210 applies the different weight change value to the first weight or second weight according to the number of small cells (e.g., 5) recognized from the base station management system (not shown).

Herein, the weight change value may increase as the number of small cells increases.

For example, taking the number of small cells as a parameter, the weight determining unit 210 may identify the weight change value using a predesignated calculation algorithm to compute a greater weight change value for a greater value of the parameter.

By applying the weight change value which increases with increase in the number of small cells to the predetermined weight (e.g., the first weight or second weight), the weight determining unit 210 may determine the quality weight as a result.

In other words, by applying a greater weight change value to the weight (e.g., the first weight or second weight) appropriately determined according to the measured RSRQ value (RSRQs) of the small cell C3 for a greater number of small cells within the coverage of the macro cell C10, the weight determining unit 210 makes the coverage of the small cell C3 appear to further extend (C3->C3' of FIG. 1) as the number of small cells increases.

The weight providing unit 220 provides the quality weight determined by the weight determining unit 210 to the terminal device 100.

Referring back to the terminal device 100, the weight assigning unit 120 assigns the quality weight according to the first embodiment or second embodiment to the measured RSRQ value (RSRQs) of the small cell C3.

Hereinafter, for simplicity, the measured RSRQ value of the small cell C3 assigned the quality weight is referred to as "RSRQs'".

The cell selector 130 selects either the macro cell C10 or the small cell C3 as an access cell based on the result of comparison between the RSRQ value (RSRQm) of the macro cell C10 and the RSRQ value (RSRQs') of the small cell C3 measured by the measuring unit 110.

That is, the cell selector 130 selects either the macro cell C10 or the small cell C3 that has the highest measured RSRQ value as the access cell, based on the result of comparison between the measured RSRQ value (RSRQm) of the macro cell C10 and the measured RSRQ value (RSRQs') of the small cell C3, as in the previous cases.

As described above, according to an embodiment of the present disclosure, a quality weight is determined based information indicating whether or not the measured RSRQ value (RSRQs) of the small cell C3 is greater than or equal to a threshold and the number of small cells within the coverage of the macro cell C10.

Accordingly, according to one embodiment, a quality weight may be determined in consideration of an interference environment where the RSRQm of the macro cell C10 measured in the frequency band f1 by the terminal device 100 remains constant regardless of the number of small cells installed within the coverage of the macro cell C10, while the RSRQs of the small cells measured in the frequency band f2 by the terminal device 100 gradually decreases due to interference among the small cells as the number of the small cells increases.

In addition, since the terminal device 100 according to an embodiment of the present disclosure, appropriately extends the coverage of the small cell C3 by assigning the determined quality weight to the measured RSRQ value (RSRQs) of the small cell C3, and then selects an access cell by comparing the RSRQm of the macro cell C10 and the RSRQs' of the small cell, the likelihood of occurrence of traffic offloading to the small cells may be increase. Thereby, cell throughput may be enhanced, addressing the problem with the conventional technology of lowering cell throughput.

Accordingly, with the terminal device according to an embodiment of the present disclosure, cell throughput may be enhanced in consideration of an interference environment created in the heterogeneous network environment where cells of different sizes using different frequency bands, namely a macro cell and small cells coexist.

Figure 4:
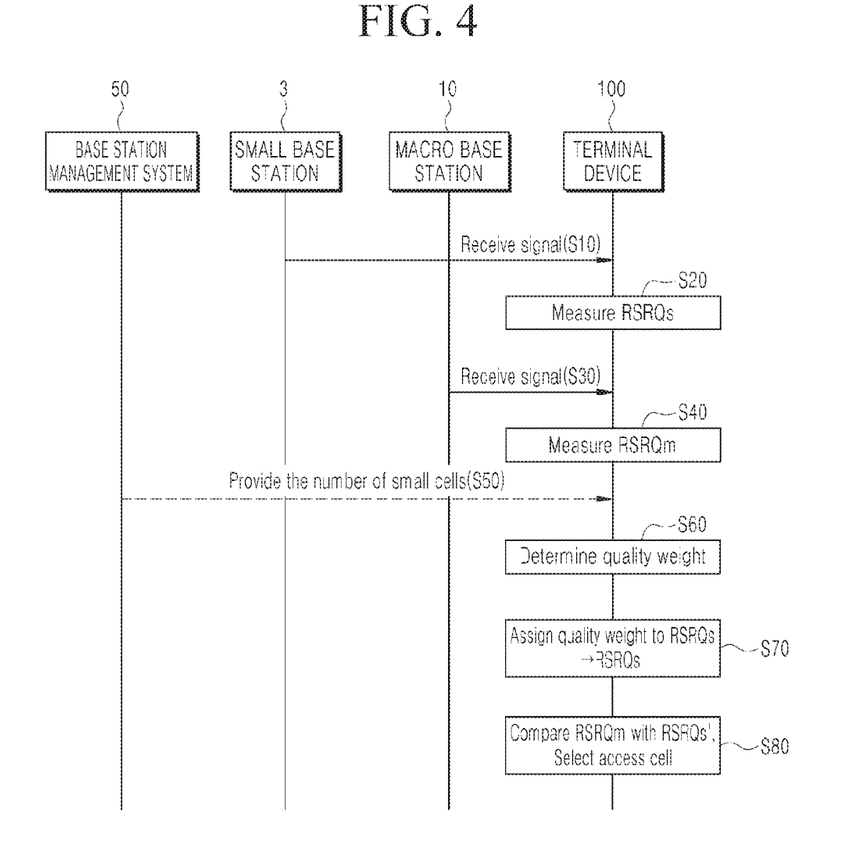
FIG. 4 is a flowchart illustrating control of a communication system including a terminal device according to an embodiment of the present disclosure.
Figure 5:
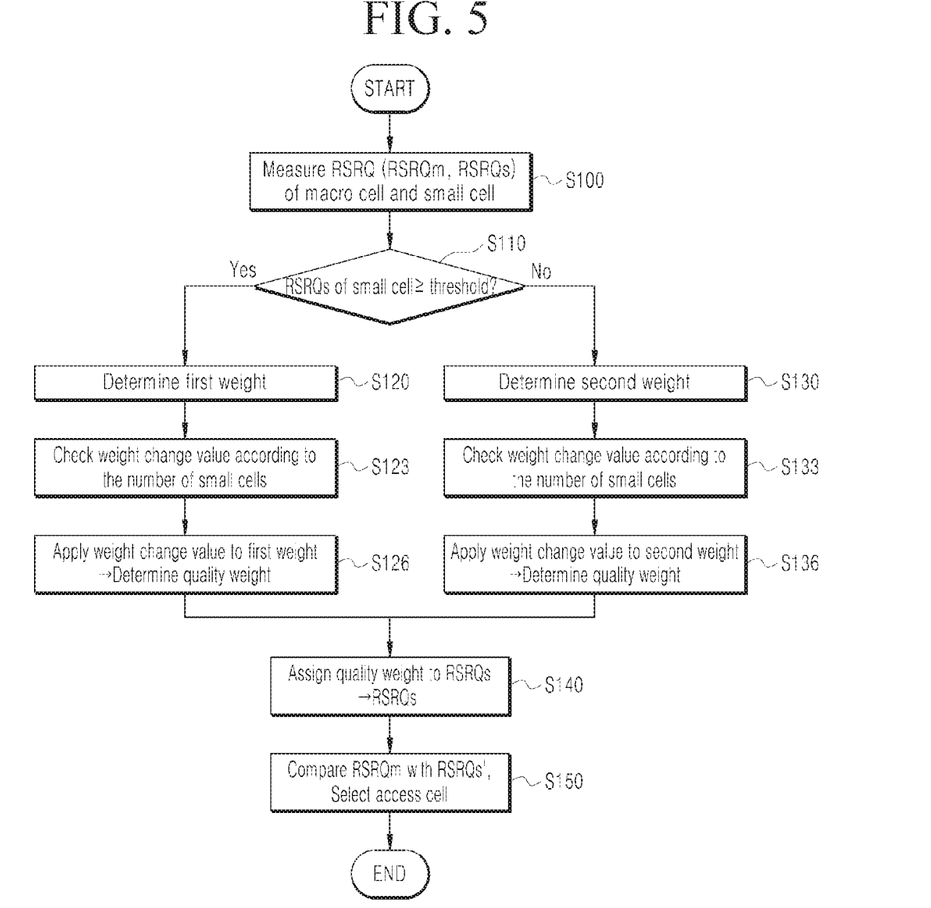
FIG. 5 is a flowchart illustrating a method of operating a terminal device according to an embodiment of the present disclosure.

Hereinafter, a method of operating a terminal device according to an embodiment of the present disclosure will be described with reference to FIGS. 4 and 5. For simplicity, reference numerals of FIGS. 1 and 2 will be mentioned in the following description.

First, a control flow of a communication system including a terminal device according to an embodiment of the present disclosure will be described with reference to FIG. 4.

It should be noted that the present disclosure is applied to a heterogeneous network environment where a macro cell C10 and small cells C1, C2, . . . , and C5 coexist.

In addition, for simplicity, the terminal device 100 according to an embodiment of the present disclosure is assumed to be positioned at the cell boundary of the small cell C3, as shown in FIG. 1.

The terminal device 100 measures RSRQ for signals received from the macro cell and the small cell.

That is, since the terminal device 100 is positioned at the cell boundary of the small cell C3 as shown in FIG. 1, the terminal device 100 receives a signal from the macro base station 10 (S10) and measures an RSRQ (RSRQm) for the signal of the macro base station 10, namely the signal from the macro cell C10 (S20).

In addition, the terminal device 100 receives a signal from the small base station 3 (S30), and measures RSRQ (RSRQs) for the signal of the small base station 3, namely the signal from the small cell C3 (S40).

Of course, the sequential order of steps S10 and S20 and the sequential order of steps S30 and S40 are not limited to the embodiment of FIG. 3. The sequential orders are changeable.

The terminal device 100 may receive, from a base station management system 50 which manages multiple macro base stations including the macro base station 10 and/or multiple small base stations including the small base stations 1 to 5, the number of small cells included in the macro cell C10 where the terminal device 100 is positioned periodically or in response to a request, and recognize the same (S50).

The terminal device 100 determines a quality weight based on at least one of the RSRQ value (RSRQs) of the small cell C3 measured in step S40 and the number of small cells recognized in step S50 (S60).

Then, the terminal device 100 assigns the determined quality weight to the measured RSRQ value (RSRQs) of the small cell C3 (S70).

Thereafter, the terminal device 100 selects a cell to access based on the result of comparison between the RSRQ value (RSRQm) of the macro cell C10 measured in step S20 and the measured RSRQ value (RSRQs') of the small cell C3 assigned the quality weight (S80).

Hereinafter, the method of operating the terminal device according to an embodiment of the present disclosure will be described in more detail with reference to FIG. 5.

According to the method of operating the terminal device 100, RSRQ is measured for signals received from a macro cell and small cells (S100).

That is, according to the method of operating the terminal device 100, since the terminal device 100 is positioned at the cell boundary of the small cell C3 as shown in FIG. 1, the terminal device 100 will measure RSRQ for signals of the macro base station 10 and the small base station 3, namely the signals received from the macro cell C10 and the small cell C3.

Hereinafter, for simplicity, the measured RSRQ value of the macro cell C10 is referred to as "RSRQm", and the measured RSRQ value of the small cell C3 is referred to as "RSRQs".

Thereafter, according to the method of operating the terminal device 100, it is determined whether or not the measured RSRQ value (RSRQs) of the small cell C3 is greater than or equal to a preset threshold (S110).

Thereby, according to the method of operating the terminal device 100, if the measured RSRQ value (RSRQs) of the small cell C3 is greater than or equal to the threshold (Yes in S110), a first weight may be determined (S120).

In other words, according to the method of operating the terminal device 100, if the measured RSRQ value (RSRQs) of the small cell C3 is greater than or equal to the threshold, the first weight, which have a relatively large value, is determined such that the coverage of the small cell C3 appears to be sufficiently extended (C3->C3' of FIG. 1) according to the first weight.

In this case, according to the method of operating the terminal device 100, a weight change value varying with the number of small cells (e.g., 5) recognized from the base station management system 50 is applied to the determined first weight.

More specifically, according to the method of operating the terminal device 100, a weight change value which increases as the number of small cells increases may be checked (S123), and then a result obtained by applying the weight change value to the first weight may be determined as the quality weight (S126).

According to the method of operating the terminal device 100, if the measured RSRQ value (RSRQs) of the small cell C3 is less than the threshold (No in S110), a second weight which is lower than the first weight may be determined (S130).

In other words, according to the method of operating the terminal device 100, if the measured a RSRQ value (RSRQs) of the small cell C3 is less than the threshold, the second weight, which has a relatively small value, is determined such that the coverage of the small cell C3 appears to be extended slightly so as not to excessively extend the coverage.

In this case, according to the method of operating the terminal device 100, a weight change value varying with the number of small cells (e.g., 5) recognized from the base station management system 50 is applied to the determined second weight.

More specifically, according to the method of operating the terminal device 100, a weight change value which increases as the number of small cells increases may be checked (S133), and then a result obtained by applying the weight change value to the second weight may be determined as the quality weight (S136).

Thereafter, according to the method of operating the terminal device 100, the quality weight determined in step S126 or S136 is assigned to the measure RSRQ (RSRQs) of the small cell C3 (S140).

Hereinafter, for simplicity, the measured RSRQ value of the small cell C3 assigned the quality weight is referred to as "RSRQs'".

Thereafter, according to the method of operating the terminal device 100, either the macro cell C10 or the small cell C3 is selected as an access cell based on the result of comparison between the RSRQ value (RSRQm) of the macro cell C10 measured in step S100 and the measured RSRQ value (RSRQs') of the small cell C3 assigned the quality weight (S150).

As described above, with the method of operating the terminal device according to an embodiment of the present disclosure, cell throughput may be enhanced in consideration of an interference environment created in the heterogeneous network environment where cells of different sizes using different frequency bands, namely a macro cell and small cells coexist.

Meanwhile, a dual connectivity technology has been introduced to the heterogeneous network environment. This technology enables a terminal to be provided with a communication service through radio resources provided from different network access points, for example, a macro cell and a small cell which use different frequency bands.

The present disclosure described above is applicable to both the terminal supporting the dual connectivity technology (hereinafter, dual connectivity supporting terminal) and the terminal which does not support the dual connectivity technology (hereinafter, dual connectivity unsupportable terminal). In particular, a greater effect may be achieved when the present disclosure is applied to the dual connectivity unsupportable terminals.

Herein, the dual connectivity supporting terminal is an LTE-A terminal, and the dual connectivity unsupportable terminals include an LTE terminal.

As another method for enhancing cell throughput in a heterogeneous network environment where cells of different sizes which use different frequency bands, namely a macro cell and a small cell coexist, the present disclosure proposes a radio resource scheduling method for a base station.

The proposed radio resource scheduling method for a base station may be applied to the macro base station 10 or the small base stations 1, 2, 3, 4, and 5.

For simplicity, in the following description, it is assumed that the proposed radio resource scheduling method for a base station is applied to the macro base station 10, and the reference numeral of the macro base station 10 will be used.

In a radio resource scheduling method for the macro base station 10 according to an embodiment of the present disclosure, a specific terminal using a radio resource allocated by the base station and a radio resource allocated by another base station connected to the specific terminal is identified among the terminals connected to the base station 10.

Since the base station 10 is a macro base station, the another base station mentioned above may be at least one of the small base stations 1, 2, 3, 4, and 5 positioned in the macro cell C10.

That is, according to the radio resource scheduling method for the base station 10, a specific terminal using a radio resource allocated by the base station 10 and a radio resource allocated by at least one of the small base stations 1, 2, 3, 4, and 5 connected to the specific terminal is identified among the terminals connected to the base station 10.

Herein, since the base station 10, namely the macro base station 10 and the small base stations 1, 2, 3, 4, and 5 use different frequency bands, the identified specific terminal may be a dual connectivity supporting terminal.

In the following description, it is assumed that the specific terminal is identified as a terminal b using radio resources allocated by the base station 10 and the small base station 1, and as a terminal c using radio resources allocated by the base station 10 and the small base station 2 among the terminals (a, b, and c of FIG. 1) connected to the base station 10.

Thereafter, according to the radio resource scheduling method for the base station 10, a specific base station preferred by specific terminals, namely, terminals b and c are identified among the base station 10 and the other base stations, namely the small base stations 1 and 2.

That is, according to the radio resource scheduling method for the base station 10, either the base station 10 or the small base station 1 which is preferred by the terminal b is identified, and either the base station 10 or the small base station 2 which is preferred by the terminal c is identified.

For simplicity, the terminals b and c, which are dual connectivity supporting terminals connected to the base station 10 which uses the frequency band f1 and the small base stations 1 and 2 which use the frequency band f2, may be divided into a macro cell dual connectivity supporting terminal having the frequency band f1 as a frequency band having a higher quality (e.g., higher RSRQ) and a small cell dual connectivity supporting terminal having the frequency band f2 as a higher-quality frequency band of the frequency bands f1 and f2.

For example, according to the radio resource scheduling method for the base station 10, a base station having a higher RSRQ may be identified as a preferred base station of a specific terminal, namely terminal b, based on the result of comparison between the RSRQ value (RSRQm) of the base station 10 measured by the terminal b and the measured RSRQ value (RSRQs) of another base station, namely the small base station 1.

In addition, according to the radio resource scheduling method for the base station 10, a base station having a higher RSRQ may be identified as a preferred base station of a specific terminal, namely terminal c, based on the result of comparison between the RSRQ value (RSRQm) of the base station 10 measured by the terminal c and the measured RSRQ value (RSRQs) of another base station, namely the small base station 2.

In brief, according to the radio resource scheduling method for the base station 10, the terminals b and c respectively identify base stations they prefer. Thereby, it is checked whether the terminals b and c are macro cell dual connectivity supporting terminals or small cell dual connectivity supporting terminals.

In the following description, for simplicity, it is assumed that the terminal b is a small cell dual connectivity supporting terminal, and the terminal c is a macro cell dual connectivity supporting terminal.

According to the radio resource scheduling method for the base station 10, if there is a specific terminal having the base station 10 as the preferred base station thereof, namely the terminal b or the terminal c, the number of radio resources allocated to the specific terminal, for example, the terminal c serving as a macro cell dual connectivity supporting terminal is increased.

Hereinafter, a method of increasing the number of allocated radio resources will be described.

For the terminal c, the base station 10 to which the terminal c is connected, namely the macro base station 10 and the small base station 2 independently perform radio resource scheduling.

The macro base station 10 allocates radio resources (resource blocks (RBs)) to the respective terminals connected thereto according to a preconfigured scheduling algorithm.

For example, the macro base station 10 may allocate RBs to the respective terminals connected thereto according to a proportional fair (PF) scheduling algorithm in consideration of cell throughput and fairness of radio resource allocation.

Of course, the small base station 2 may also allocate radio resources to the respective terminals connected thereto according to a preconfigured scheduling algorithm, for example, the PF scheduling algorithm.

Accordingly, according to the radio resource scheduling method for the base station 10, the base station 10 will allocate a radio resource to a specific terminal, namely the terminal c which serves as a macro cell dual connectivity supporting terminal through the procedure of allocating radio resources to the respective terminals connected thereto according to a preconfigured scheduling algorithm, for example, the PF scheduling algorithm.

More specifically, according to the radio resource scheduling method for the base station 10, the base station 10 may calculate a scheduling factor (PF factor) associated with the number of allocated radio resources for each terminal connected thereto according to a preconfigured scheduling algorithm, for example, the PF scheduling algorithm.

According to the radio resource scheduling method for the base station 10, if the terminal for which the scheduling factor is currently calculated is the terminal c which serves as a macro cell dual connectivity supporting terminal, a specific factor weight is assigned to the scheduling factor calculated for the terminal c, and then radio resources are allocated to the terminal c according to the scheduling factor assigned the specific factor weight.

Of course, according to the radio resource scheduling method for the base station 10, if the terminal for which the scheduling factor is currently calculated is not a macro cell dual connectivity supporting terminal (e.g., terminal a or terminal c), radio resources may be allocated to the terminal without assigning the specific factor weight to the scheduling factor calculated for the terminal. Alternatively, radio resources may be allocated to the terminal according to a scheduling factor recalculated based on the radio resources which are left after radio resources are allocated to the terminal c which is a macro cell dual connectivity supporting terminal.

Of course, the small base stations 1, 2, 3, 4, and 5 may also operate according to the radio resource scheduling method described above.

When each of the base stations, namely the macro base station 10 and the small base stations 1, 2, 3, 4, and 5 operate according to the radio resource scheduling method of the present disclosure in heterogeneous network environment, each base station allocates more radio resources to a dual connectivity supporting terminal having the base station as a preferred base station than to the other terminals.

Generally, the macro cell dual connectivity supporting terminal and the small cell dual connectivity supporting terminal are evenly assigned radio resources in the frequency bands f1 and f2 from the macro base station and small base station to which the terminals are connected in the manner described above. However, since the small cell dual connectivity supporting terminal has a transmission channel with a relatively low quality in the frequency band f1, it causes performance degradation of macro cell throughput. Similarly, the macro cell dual connectivity supporting terminal causes performance degradation of small cell throughput.

On the other hand, when the respective base stations, namely the macro base station 10 and the small base stations 1, 2, 3, 4, and 5 operate according to the radio resource scheduling method, each base station allocates more radio resources to dual connectivity supporting terminals having the base station as a preferred station than to the other terminals. Thereby, cell throughput may be enhanced, addressing performance degradation of macro cell throughput and small cell throughput. In addition, fairness of allocation of radio resources to the respective terminals may be ensured throughout the frequency bands f1 and f2.

The method for operating a terminal device according to an embodiment of the present disclosure may be implemented in the form of program commands executable through various computer means and written in a computer readable medium. The computer readable medium may include program commands, data files, data structures, or a combination thereof. The program commands written in the computer readable medium may be specifically designed and configured for the present disclosure or may be available as they are well known to those skilled in the art of computer software. Examples of the computer readable recording medium include magnetic media such as a hard disk, a floppy disk and a magnetic tape, optical media such as CD-ROM and DVD, magneto-optical media such as a floppy disk, and hardware devices such as ROM, RAM and flash memory which are specifically designed to store and execute program commands Examples of program commands include machine language codes created by a compiler and high-level language codes executable on a computer using, for example, an interpreter. The hardware devices may be configured to operate as one or more software modules to perform operations of the present disclosure, and vice versa.

Preferred embodiments of the present disclosure have been described in detail above. However, it should be noted that the present disclosure is not limited to the specific embodiments described above. It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

The invention claimed is:

1. A terminal device comprising:
   a measuring unit configured to measure quality for each of signals respectively received from a macro cell and one or more small cells, wherein the quality for each of the received signals indicates reference signal received quality (RSRQ);
   a weight assigning unit configured to assign a quality weight to a measured RSRQ value of each of the small cells, wherein the quality weight is determined based on at least one of the measured RSRQ value of each small cell and the number of the small cells, wherein the measured RSRQ value of each small cell indicates a value for measuring RSRQ based on a signal respectively received from the small cells; and
   a cell selector configured to select a cell to access from among the macro cell and the small cells, based on a result of comparison between a measured RSRQ value of the macro cell and the measured RSRQ value, to which the quality weight is assigned, of each small cell.

2. The terminal device according to claim 1, wherein the small cells are included within coverage of the macro cell, wherein the number of the small cells is the number of all small cells included within the coverage of the macro cell.

3. The terminal device according to claim 1, wherein the quality weight has a value increasing as the measured RSRQ value of each small cell increases and the number of small cells increases.

4. The terminal device according to claim 1, wherein the weight assigning unit determines a weight depending on whether or not the measured RSRQ value of each small cell is greater than or equal to a preset threshold, and determines the quality weight by applying a change value depending on the number of the small cells to the weight.

5. The terminal device according to claim 4, wherein the weight comprises:
   a first weight determined when the measured RSRQ value of each small cell is greater than or equal to the preset threshold; and
   a second weight determined when the measured RSRQ value of each small cell is less than the preset threshold, the second weight being lower than the first weight,
   wherein the weight change value increases as the number of the small cells increases.

6. The terminal device according to claim 1, wherein the number of the small cells is recognized through information provided from a base station management system periodically or in response to a request, or recognized from a signal received from at least one of the macro cell and the small cells.

7. The terminal device according to claim 1, wherein the weight assigning unit receives the quality weight from at least one of the macro cell and the small cells.

8. A base station comprising:
   a weight determining unit configured to determine a quality weight based on at least one of a measured RSRQ value of each of one or more small cells measured by a terminal and the number of the small cells in relation to the terminal measuring quality for each of signals respectively received from a macro cell and the small cells, wherein the quality for each of the received signals indicates reference signal received quality (RSRQ); and
   a weight providing unit configured to provide the quality weight to the terminal for selecting a cell to access from among the macro cell and the small cells, by assigning the quality weight to the measured RSRQ value of each small cell and comparing the measured RSRQ value, to which the quality weight is assigned, of each small cell with a measured RSRQ value of the macro cell.

9. The base station according to claim 8, wherein the weight determining unit determines a weight depending on whether or not the measured RSRQ value of each small cell is greater than or equal to a preset threshold, and determines the quality weight by applying a weight change value depending to the number of the small cells to the weight.

10. The base station according to claim 9, wherein the weight comprises:
    a first weight determined when the measured RSRQ value of each small cell is greater than or equal to the preset threshold; and
    a second weight determined when the measured RSRQ value of each small cell is less than the preset threshold, the second weight being lower than the first weight,
    wherein the weight change value increases as the number of the small cells increases.

11. The base station according to claim 8, wherein a cell formed by the base station is the macro cell or a small cell of the small cells.

12. A method of operating a terminal device, comprising:
    measuring quality for each of signals respectively received from a macro cell and one or more small cells, wherein the quality for each of the received signals indicates reference signal received quality (RSRQ);
    assigning a quality weight to a measured RSRQ value of each of the small cells, wherein the quality weight is determined based on at least one of the measured RSRQ value of each small cell and the number of the small cells, wherein the measured RSRQ value of each small cell indicates a value for measuring RSRQ based on a signal respectively received from the small cells; and
    selecting a cell to access from among the macro cell and the small cells, based on a result of comparison between a measured RSRQ value of the macro cell and the measured RSRQ value, to which the quality weight is assigned, of each small cell.

13. The method according to claim 12, wherein the quality weight has a value increasing as the measured RSRQ value of each small cell increases and the number of small cells increases.

14. The method according to claim 12, wherein the step of assigning comprises:
    determining a weight depending on whether or not the measured RSRQ value of each small cell is greater than or equal to a preset threshold; and
    determining the quality weight by applying a weight change value depending on the number of the small cells to the weight.

15. The method according to claim 14, wherein the weight comprises:
- a first weight determined when the measured RSRQ value of each small cell is greater than or equal to the preset threshold; and
- a second weight determined when the measured RSRQ value of each small cell is less than the preset threshold, the second weight being lower than the first weight,
- wherein the weight change value increases as the number of the small cells increases.

* * * * *